(No Model.) 3 Sheets—Sheet 1.

C. L. GOEHRING.
MOLDING MACHINE.

No. 450,788. Patented Apr. 21, 1891.

WITNESSES:
E. D. Smith
Thomas Durant

INVENTOR
Charles L. Goehring
BY
Church & Church
HIS ATTORNEYS

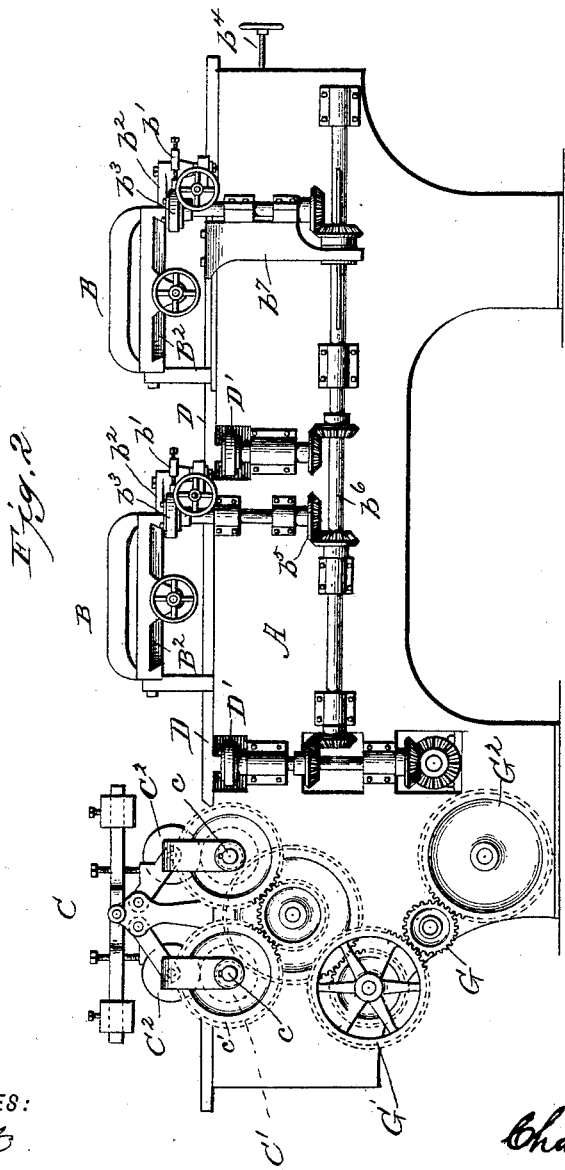

(No Model.)  3 Sheets—Sheet 3.
C. L. GOEHRING.
MOLDING MACHINE.
No. 450,788. Patented Apr. 21, 1891.
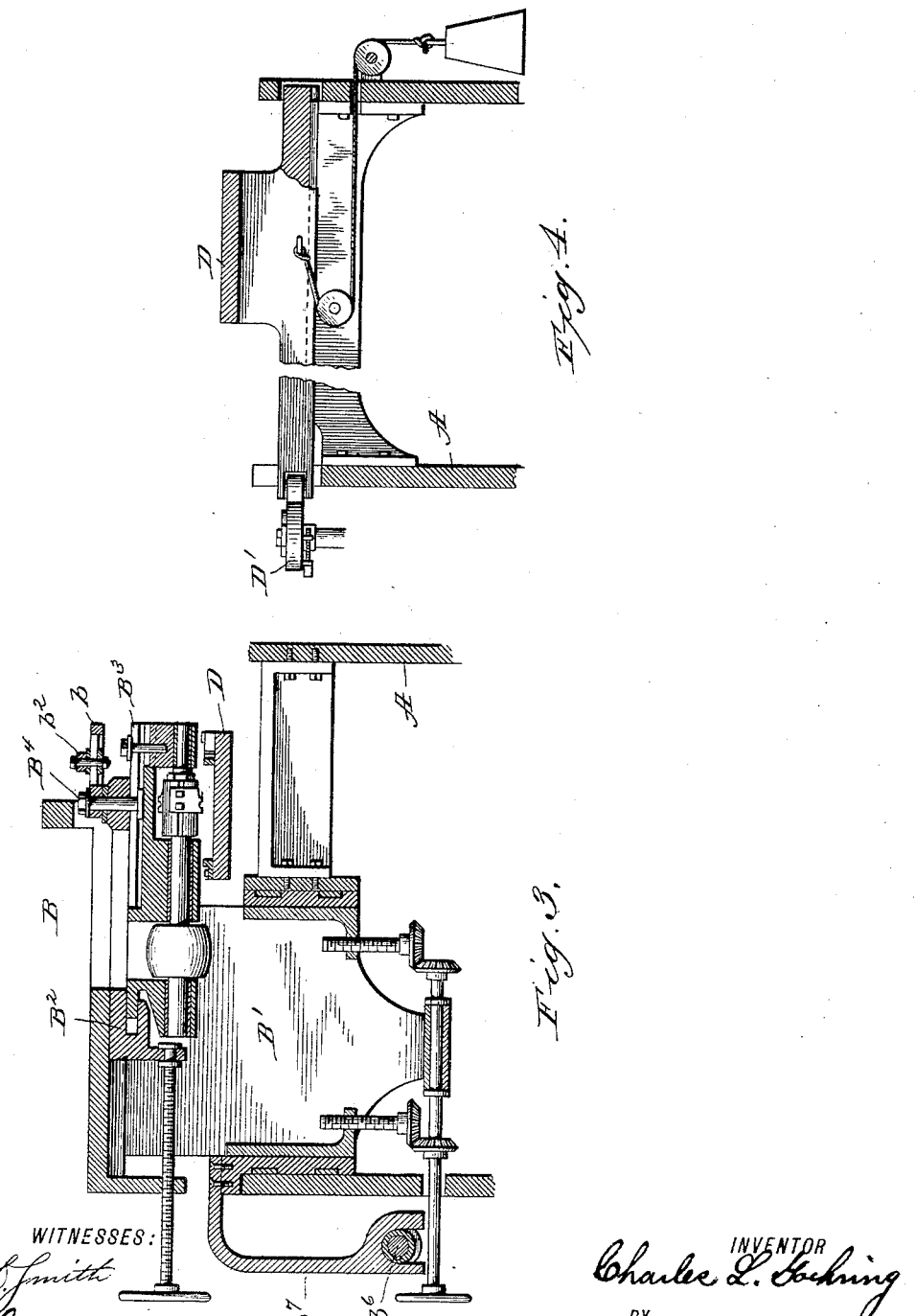

UNITED STATES PATENT OFFICE.

CHARLES L. GOEHRING, OF ALLEGHENY, PENNSYLVANIA.

MOLDING-MACHINE.

SPECIFICATION forming part of Letters Patent No. 450,788, dated April 21, 1891.

Application filed December 3, 1890. Serial No. 373,487. (No model.)

*To all whom it may concern:*

Be it known that I, CHARLES L. GOEHRING, of Allegheny, in the county of Allegheny and State of Pennsylvania, have invented certain new and useful Improvements in Molding-Machines; and I do hereby declare the following to be a full, clear, and exact description of the same, reference being had to the accompanying drawings, forming a part of this specification, and to the letters of reference marked thereon.

This invention relates to an improved machine for practicing the method of ornamenting or figuring the surface of wood described in my patent of December 18, 1888, No. 394,767; and it consists, primarily, in the novel construction and arrangement of mechanism for effecting the oscillatory reciprocating movements as between the rotary cutter-head and the material operated upon to preserve the proper direction and action of the cutter.

To this end the invention consists in mounting the arbor for the cutter-head so that it will be given an oscillatory movement about an axis substantially perpendicular to the axis of the arbor and intersecting the principal cutter, while the material acted upon is given a lateral reciprocatory movement in addition to a uniform or variable longitudinal feed movement, all as hereinafter described, and pointed out in the claims.

In the drawings, Figure 1 is a plan view, and Fig. 2 a side elevation, of a machine embodying my improvements. Fig. 3 is a sectional view of one of the oscillating cutting mechanisms. Fig. 4 is a detail of the laterally-reciprocating table or support.

Similar letters of reference in the several figures indicate the same parts.

The main or supporting frame A is constructed in any suitable manner to receive the cutting mechanism B, the feed mechanism C, and the movable supporting surface, surfaces, or table for the material, together with the necessary gearing for connecting the actuating devices.

The cutting mechanism B, of which two examples are shown arranged for conjoint or separate action, comprises a vertically-adjustable frame B', provided with a horizontally-adjustable slide $B^2$, in which is pivotally supported an oscillatory arbor-frame $B^3$. The pivot $B^4$, about or upon which the arbor-frame vibrates, is located opposite the cutter-head, and is furnished with an arm $b$, through which motion is communicated to the arbor-frame. Any convenient actuating mechanism may be employed for effecting the oscillatory movements of the arbor-frame, such, for example, as the lever $b'$, connected to arm $b$ by a link $b^2$ and operated upon by a pattern cam or eccentric $b^3$, a weight or spring being employed for retracting the arbor-frame to hold the lever against the cam.

When two cutting mechanisms B are employed, provision should be made for adjusting or varying the distance apart, which may conveniently be effected by means of an adjusting-screw $b^4$, acting upon the frame B' to shift the latter, with the mechanism mounted thereon, longitudinally of the machine, said frame being supported upon guides to permit of a movement toward and away from the adjacent cutting mechanism B. The cams $b^3$, for effecting the oscillatory movements of the cutter-heads, are driven through bevel-gears $b^5$ from a line-shaft $b^6$, and provision is made for shifting the bevel-gears of the movable cutting mechanism, as by forming a feather or groove on the shaft and connecting the bevel-wheel with the movable frame B' by a hanger $b^7$.

Extending longitudinally of the machine and beneath the cutter-heads of the cutting mechanism B is the work-support or table D, upon which the work or plank is supported during its passage through the machine. This table or work-support D is mounted to reciprocate laterally upon guides or ways on the frame, so that as the material or plank is carried forward by the feeding devices it will be given a lateral reciprocation corresponding or proportional to the oscillatory motion of the cutter-head, whereby the action described in my said prior patent will be secured. The lateral movements of the table or work-support may be produced and governed in a variety of ways—as, for example, by pattern cams or eccentrics D', driven from the line-shaft $b^6$, the table being held against said cams by weights. The table is provided with suitable guides for holding the plank in place during its passage through the machine to prevent lateral displacement and compel the plank to follow the movements of the table or support.

The movements of the plank longitudinally of the machine are governed and controlled by a suitable feeding mechanism, the principal parts or the whole of which may be supported upon the movable table D to partake of its reciprocatory motions, or the feeding devices may be entirely independent of table D and arranged and adapted to be given a reciprocatory movement corresponding to that of the table.

In the example illustrated the feeding mechanism is of a well-known type, comprising feeding-rolls C' and weighted pressure-rollers C², supported in bearings upon table D and partaking of the movements of the latter, as effected by cams D'. These shafts $c$ of the rolls C'˄ are connected to their driving gears $c'$ in a manner to permit said shafts to move freely in the direction of their axes, but prevent rotary motion in the gears. An example of a connection such as referred to is furnished by a groove and spline, as shown.

The actuating mechanisms for effecting the oscillatory motion of the cutter-heads, the lateral motions of the table, and the rotary motions of the feed-rolls are all connected through a system of gearing, of which G is the driving-shaft, G' the gear-train leading to the feeding-rolls, and G² the gear-train leading to the actuating devices for the table and cutter.

As will be obvious to the skilled mechanic, other and equivalent forms of actuating devices and mechanisms can be employed in carrying out my invention, which resides principally in the employment of the laterally-reciprocating table or other form of work-support in connection with the cutter arranged to oscillate about a fixed axis and devices for causing the advance movements of the material, whereby the adjustment of the several motions relatively to each other for producing a variety of designs can be much more readily, accurately, and speedily effected than when the cutter-head alone is subjected to the oscillatory reciprocating motions necessary for the production of the design.

Having thus described my invention, what I claim as new is—

1. In a machine such as described, the combination of a feeding mechanism, a laterally-movable work-support or table, and a cutter-head mounted to oscillate about an axis intersecting the cutters and the material, substantially as described.

2. In a machine such as described, the combination, with the rotary cutter-head mounted to oscillate about a fixed axis substantially perpendicular to the axis of the arbor, of a laterally-reciprocating table or work-support extending beneath the cutter, and feeding devices engaging the plank to advance the latter in a direction longitudinally of the table, substantially as described.

3. In a machine such as described, the combination, with the laterally-movable work-support or table and devices controlling said movements, of the cutter-head mounted in a frame overhanging the table and supported to oscillate about a center or axis perpendicular to the face of the table and intersecting the cutters, substantially as described.

4. In combination with the oscillating cutter, the laterally-reciprocating table carrying the feeding mechanism, substantially as described.

5. In a machine such as described, a laterally-movable work-support or table provided with feeding devices for advancing the material resting upon said support, and a cutter-head located above the support and arranged to oscillate about an axis or center perpendicular to the table and the axis of rotation of the cutter-head, substantially as described.

6. In a machine such as described, the combination of the laterally-reciprocating work-support or table, the oscillating cutter overlaying the table or work-support, the actuating mechanism controlling the reciprocating motions of the table and the oscillatory motions of the cutter-head, said actuating mechanism deriving motion from a gear-train common to both, substantially as described.

7. In a machine such as described, the combination, with the laterally-reciprocating table, of two oscillatory cutter-heads adjustable with respect the one to the other in a direction longitudinally of the table, substantially as described.

8. The combination, with the feeding mechanism and laterally-reciprocating work-support, of the oscillating cutter-head supported on an axis in a fixed frame, and the oscillating cutter-head supported to oscillate about an axis adjustable toward and from the axis of the other cutter, substantially as described.

CHARLES L. GOEHRING.

Witnesses:
 RODERICK BOLANCH,
 PETER McKAY.